(12) United States Patent
Luhman et al.

(10) Patent No.: US 6,771,712 B2
(45) Date of Patent: Aug. 3, 2004

(54) SYSTEM FOR EXTRACTING A CLOCK SIGNAL AND A DIGITAL DATA SIGNAL FROM A MODULATED CARRIER SIGNAL IN RECEIVER

(75) Inventors: Ricky K. Luhman, Lacross, WI (US); Dennis J. Devlin, Wayne, MI (US)

(73) Assignee: The Pulsar Network, Inc., Wayne, MI (US)

( * ) Notice: Subject to any disclaimer, the term of this patent is extended or adjusted under 35 U.S.C. 154(b) by 409 days.

(21) Appl. No.: 09/916,760

(22) Filed: Jul. 27, 2001

(65) Prior Publication Data

US 2003/0021360 A1 Jan. 30, 2003

(51) Int. Cl.[7] ............ H04L 27/22; H04L 25/10; H04Q 1/20
(52) U.S. Cl. ............ 375/316; 375/224; 375/317
(58) Field of Search ............... 375/316, 224, 375/256, 317; 179/1; 364/527

(56) References Cited

U.S. PATENT DOCUMENTS

| | | | |
|---|---|---|---|
| 3,894,246 A | | 7/1975 | Torgrim |
| 3,919,641 A | * | 11/1975 | Kurokawa et al. .......... 375/268 |
| 4,308,619 A | * | 12/1981 | Hughes ....................... 375/373 |
| 4,319,204 A | * | 3/1982 | Weldon et al. .............. 332/113 |
| 4,405,837 A | * | 9/1983 | Ecklund ....................... 381/15 |
| 4,421,993 A | * | 12/1983 | Bloomer ...................... 307/126 |
| 4,454,587 A | * | 6/1984 | Kiefer et al. ............ 250/385.1 |
| 4,637,036 A | | 1/1987 | Kobari |
| 4,740,998 A | | 4/1988 | House |
| 4,937,840 A | | 6/1990 | Hotine |
| 4,985,697 A | | 1/1991 | Boulton |
| 4,989,219 A | * | 1/1991 | Gerdes et al. .............. 375/286 |
| 4,996,444 A | | 2/1991 | Thomas et al. |
| 5,138,633 A | | 8/1992 | Cortese |
| 5,164,966 A | | 11/1992 | Hershberger |
| 5,371,766 A | | 12/1994 | Gersbach et al. |
| 5,499,028 A | * | 3/1996 | Kuwano et al. ............ 341/159 |
| 5,546,032 A | | 8/1996 | Yatagai |
| 5,671,258 A | | 9/1997 | Burns et al. |
| 5,796,795 A | | 8/1998 | Mussman et al. |
| 5,949,255 A | | 9/1999 | Shyu |
| 6,081,565 A | * | 6/2000 | Marandi et al. ............ 375/345 |
| 6,194,934 B1 | | 2/2001 | Detering |
| 6,438,178 B1 | * | 8/2002 | Lysdal et al. .............. 375/317 |
| 6,493,401 B1 | * | 12/2002 | Erckert ....................... 375/316 |

FOREIGN PATENT DOCUMENTS

WO  WO 96/31038  3/1996

OTHER PUBLICATIONS

IBM Technical Disclosure Bulletin, vol. 29, No. 2, Jul. 1986, Data Detector and Clock Recovery Circuit for Dibit (2,8) Code, pp. 536–538.

* cited by examiner

Primary Examiner—Stephen Chin
Assistant Examiner—Cicely Ware
(74) Attorney, Agent, or Firm—John A. Miller; Warn, Hoffmann, Miller & LaLone, P.C.

(57) ABSTRACT

A transmitter circuit for transmitting a sine wave modulated with digital data, where the sine wave includes a clock signal, and a receiver circuit for demodulating the transmitted sine wave, where the receiver circuit extracts the clock signal and the digital data from the sine wave. The transmitter circuit includes digital logic components that allow the transmitted sine wave to include at least one bit per cycle of the sine wave, and the receive circuit includes digital logic components that allow the clock signal and the digital data to be extracted from the sine wave. In various embodiments, the transmitted sine wave includes one bit per cycle, one bit per half cycle, multiple bits per cycle and multiple bits per half cycle.

47 Claims, 11 Drawing Sheets

SYSTEM FOR EXTRACTING A CLOCK SIGNAL AND A DIGITAL DATA SIGNAL FROM A MODULATED CARRIER SIGNAL IN RECEIVER

BACKGROUND OF THE INVENTION

1. Field of the Invention

This invention relates generally to a system and method for modulating and demodulating a clock signal and digital data onto and from a sinusoidal carrier wave and, more particularly, to a system and method for modulating and demodulating a clock signal and a digital data signal onto and from a sinusoidal carrier wave, where at least one bit of data coincides with each cycle in the carrier wave.

2. Discussion of the Related Art

Digital data is transmitted from a transmitter to a receiver in digital communications systems. The digital data is modulated onto a sinusoidal carrier wave in the transmitter, transmitted, and then demodulated or extracted from the carrier wave in the receiver so that the data can be processed. Various modulation and demodulation schemes are known in the art for modulating the carrier wave to distinguish the zero and one bits in the transmitted signal.

Known modulation techniques include amplitude modulation or on/off keying (OOK) where a change in the amplitude of the carrier wave distinguishes a one bit and a zero bit; frequency-shift keying (FSK) where the frequency of the carrier wave is changed to distinguish a one bit and a zero bit; phase-shift keying (PSK) where polarity changes in the carrier wave provides a 180° phase change that is used to distinguish a one bit and a zero bit; and quadrature amplitude modulation (QAM) where the digital data is converted into two-bit symbols which are used to phase modulate the carrier wave. Other types of modulation schemes that combine or are hybrids of those mentioned above are also known in communications systems.

Typically, the transmitter and the receiver employ asynchronous clock signals to control the operation of the various logic circuits. Therefore, the data stream must by synched to the clock signal in the receiver to extract the data. In some systems, a clock signal is transmitted with the data to provide increased clock synchronization capabilities. Further, based on the Nyquist sampling theorem, the sampling rate of the data in the receiver must be at least twice as fast as the data rate. In other words, there must be a minimum of two clock cycles in the receiver for every bit of data. Typically, the data rate is arbitrary relative to the receiver clock signal rate. Thus, there are inherent limitations on how much data can be transmitted at a certain clock rate in the known systems.

Moreover, because the clock signal rate in the receiver is different than the data frequency rate of the transmitted data, there are bandwidth limitations in the system. Particularly, the frequency of the data rate adds sidebands to the center frequency of the carrier wave, which limits the bandwidth in which other carrier waves can be transmitted. Therefore, by not synchronizing the data to the clock, the necessary bandwidth for data transmission is increased. Also, because the carrier waves are typically generated by crystals that have inherent limitations in accuracy, the center frequency of the carrier wave may vary from time to time from an average center frequency.

SUMMARY OF THE INVENTION

In accordance with the teachings of the present invention, a system and method for modulating and demodulating a clock signal and a data signal onto and from a common sinusoidal carrier wave is disclosed. In one embodiment, a transmitter is provided where the clock pulse signal is converted to a sine wave that is amplified by a comparator device. The data signal to be transmitted is a gain input to the amplifier, so that if the data signal is high, representing a digital one, the sine wave is amplified by the amplifier, and if the data signal is low, representing a digital zero, the sine wave is not amplified by the amplifier. Therefore, the output of the amplifier is an amplitude modulated sine wave that transmits both the clock signal and the data signal where teach cycle in the sine wave represents a single bit.

In one embodiment for the transmitter above, a receiver circuit is provided for receiving the modulated sine wave and separating a pulsed clock signal and a digital data stream from the sine wave. A first comparator device receives the modulated sine wave and a first predetermined threshold signal, and outputs the pulsed clock signal. A second comparator device receives the modulated sine wave and a second predetermined threshold signal, and outputs a pulse for each one bit transmitted. A third comparator device receives the modulated sine wave, and outputs an inverted modulated sine wave. A fourth comparator devices receives the inverted modulated sine wave and a third predetermined threshold signal, and outputs a pulse signal having positive pulses for each negative portion of the non-inverted modulated sine wave. A flip-flop devices receives the pulse signal from the second comparator device at a set input and the pulse signal from the fourth comparator device at a reset input, where the flip-flop device outputs a pulse each time the second comparator device outputs a pulse so that each cycle of the modulated sine wave identifies a bit in the data stream.

In another embodiment, the transmitter modulates the clock pulse signal with the digital data, where each half-cycle of the sine wave includes a bit. In this embodiment, the clock pulse signal is divided by two before being converted to the sine wave.

A receiver is provided to separate the clock signal and the data signal from the modulated sine wave transmitted by the transmitter. The receiver includes a first comparator device that receives the modulated sine wave from the transmitter and a first predetermined threshold signal. The receiver further includes an inverter that inverts the modulated carrier wave. A second comparator device receives the inverted modulated carrier wave and a second predetermined threshold signal. A first logic gate receives a pulse output signal from the first comparator device and a pulse output signal from the second comparator device. The first logic gate outputs a pulsed clock signal in response to the first and second pulse signals.

A third comparator device receives the modulated carrier wave and a third threshold signal, and a fourth comparator device receives the inverted modulated carrier wave and a fourth threshold signal. A first flip-flop device receives a first set signal from the third comparator device and a first reset signal from the fourth comparator device, where the first flip-flop device outputs the first set signal and the first reset signal resets the first flip-flop device to zero for each pulse of the first reset pulse signal. A fifth comparator device receives the modulated carrier wave and a fifth threshold signal. A second logic gate receives the first set signal at the output of the first flip-flop device and a second pulse signal from the fifth comparator device, where the second logic gate outputs a high signal when both the second pulse signal and the output of the first flip-flop device are high.

The receiver further includes a sixth comparator device that receives the modulated carrier wave and a sixth threshold signal, and a seventh comparator device that receives the inverted modulated carrier wave and a seventh threshold signal. A second flip-flop device receives a second set pulse signal from the seventh comparator device and a second reset pulse signal from the sixth comparator device, where the second flip-flop device outputs the second set pulse signal and the second reset pulse signal resets the output of the second flip-flop device to zero each time the second reset pulse signal is high.

An eighth comparator device receives the inverted modulated sine wave and a eighth threshold signal. A third logic device receives the second set pulse signal from the second flip-flop device and a third pulse signal from the eighth comparator device, where the third logic gate outputs a high signal when both the output of the second flip-flop device and the eighth comparator device are high. A fourth logic gate receives the outputs from the second and third logic gates, and provides a pulse output each time either of the outputs of the second or third logic gate is high. Thus, when the output of the fourth logic gate is high, a digital one is provided, and when the output of the fourth logic gate is low, a digital zero is provided.

In another embodiment, a transmitter is provided for transmitting a sine wave modulated with a digital data stream, where the sine wave includes multiple bits for every cycle. The transmitter includes a divide-by-two counter that receives a square wave clock signal, and divides the clock signal by two. A first inverter inverts the clock signal, and a second inverter inverts the divided clock signal. A square wave-to-sine wave converter receives the inverted and divided clock signal, and converts the square wave clock signal to a sine wave that is modulated with the digital data. An output amplifier receives the sine wave from the converter, which has a gain input that is set by the digital data.

A first logic gate receives the inverted clock signal and the divided clock signal, and outputs a high signal when both the inverted clock signal and the divided clock signal are high. A first flip-flop device receives the output of the first logic gate and the digital data signal, and transfers the data signal to its output when the output of the first logic gate is high. A second logic gate receives the inverted clock signal and the divided clock signal, and outputs a high signal when both the inverted clock signal and the inverted and divided clock signal are high. A second flip-flop device receives the data signal and the output of the second logic gate, and transfers the data signal to its output when the output of the second logic gate is high.

A buffer receives the output of the first flip-flop device and the second flip-flop device, and receives an inverted output of the first logic gate as a clock signal. The buffer simultaneously outputs the outputs of the first flip-flop device and the second flip-flop device each time the inverted output of the first logic gate is high. A summing amplifier, including a voltage divider network, receives both of the outputs of the buffer, where the voltage divider network divides the output of the buffer so that the summing amplifier outputs a first signal level, a second signal level, a third signal level or a fourth signal level depending on the bits being transmitted. The output of the summing amplifier is the gain input to the output amplifier.

A receiver is provided that demodulates the sine wave transmitted by the transmitter described above, and extracts the multiple bits of digital data on every cycle of the sine wave. The receiver employs the same type of logic structure as discussed herein to provide this function. In yet another embodiment, the transmitter modulates the sine wave so that multiple bits are transmitted for every half-cycle of the sine wave. A receiver is provided that is also based on the logic structure discussed herein that extracts the multiple bits of digital data on every half-cycle of the modulated sine wave.

Additional objects, advantages and features of the present invention will become apparent from the following description and appended claims, taken in conjunction with the accompanying drawings.

DETAILED DESCRIPTION OF THE EMBODIMENTS

The following discussion of the embodiments of the invention directed to various modulation and demodulation schemes for modulating clock and data signals onto a carrier wave and demodulating the carrier wave are merely exemplary in nature, and are in no way intended to limit the invention or its applications or uses.

Figure 1:
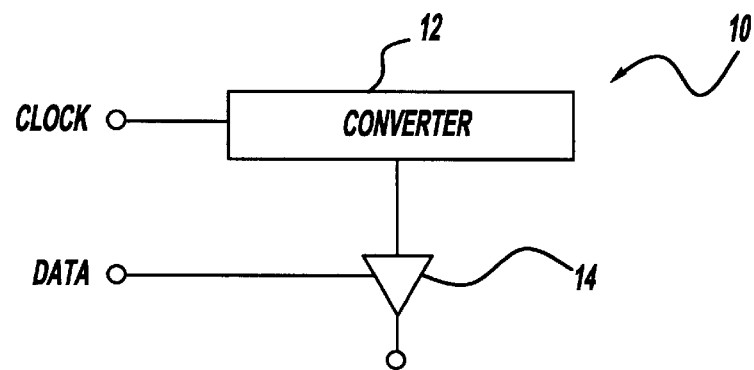
FIG. 1 is a schematic diagram of a modulator circuit in a transmitter, according to the invention, where each cycle of a carrier wave includes a single bit.
Figure 2:
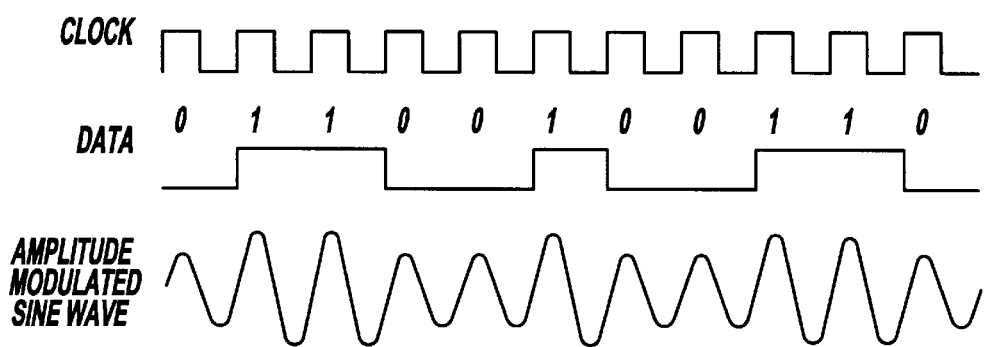
FIG. 2 is a plurality of signal lines showing the clock, data and carrier wave signals for the modulator circuit shown in FIG. 1.

FIG. 1 is schematic diagram of a modulator circuit 10 for use in a transmitter transmitting digital data in a communications system, according to the invention. The modulation circuit 10 modulates a carrier wave with digital data to be transmitted, where each cycle of the carrier wave represents a zero bit or a one bit. In the example being discussed herein, the serial bit data bit stream 01100100110 is being transmitted. FIG. 2 shows a plurality of signal lines, where the pulsed clock signal is shown in the first line and the data signal is shown in the second line, and where the two signals are synchronized relative to each other. The clock signal is synchronized with the data signal being transmitted in any manner known in the art. Many suitable techniques exist for synchronizing clock and data signals, as would be appreciated by those skilled in the art.

The clock signal is applied to a square wave-to-sine wave converter 12 to convert the square-pulse clock signal to the sinusoidal carrier wave. Any suitable device, such as a frequency generator, that converts a square wave clock signal to a corresponding sine wave can be used within the scope of the present invention. The converted sine wave from the frequency generator 12 is an input to an operational amplifier 14, where the amplified sine wave is the carrier wave that is transmitted. The data signal is a gain control input to the amplifier 14, so that when the data signal is low, representing a zero bit, the sine wave from the converter 12 is not amplified, and when the data signal is high, representing a one bit, the sine wave from the generator 12 is amplified. In this example, the un-amplified sine wave has a one volt amplitude at its positive peak, and the amplified sine wave has a two volt amplitude at its positive peak. However, other voltage amplitudes can be used, as would be well appreciated by those skilled in the art. Thus, the output of the amplifier 14 is an amplitude modulated carrier wave shown as a third signal line in FIG. 2. As is apparent, each cycle of the carrier wave represents a bit in the data stream.

Figure 3:
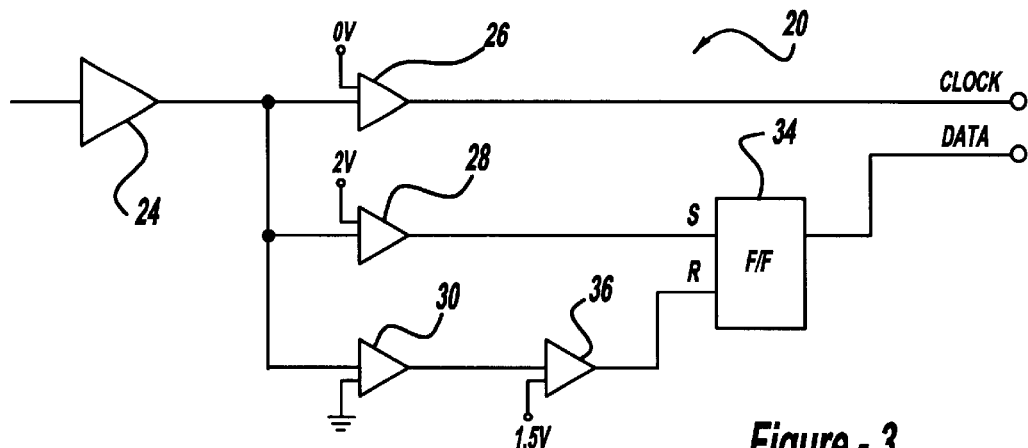
FIG. 3 is a schematic diagram of a demodulator circuit in a receiver, according to the invention, where the demodulator circuit extracts the clock and data signals modulated onto the carrier wave in FIG. 1.
Figure 4:
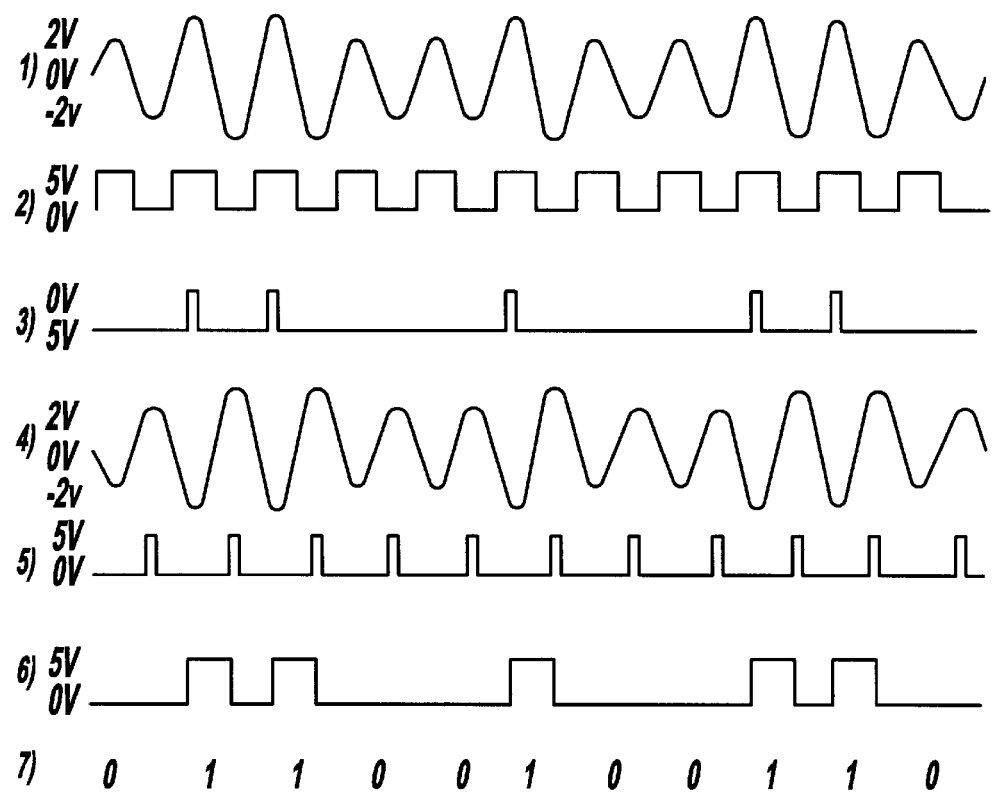
FIG. 4 is a plurality of signal lines for the demodulator circuit shown in FIG. 3.

FIG. 3 is a schematic diagram of a receiver circuit 20 that receives the modulated sine wave transmitted by the transmitter including the modulator circuit 10, and that separates the clock and data signals for communications processing. FIG. 4 shows a series of signal lines for different locations in the receiver circuit 20, as will be discussed below. The signal is received by a receiver front end circuit (not shown), that includes an antenna and other signal conversion circuitry, such as a bandpass filter, as would be well understood to those skilled in the art.

The received signal is then sent to an automatic gain controlled (AGC) amplifier 24 where it is amplified to a stable sine wave for subsequent signal processing. The amplifier 24 can be any amplifier suitable for the purposes described herein. The first signal line of FIG. 4 is the amplified sine wave from the amplifier 24. The amplified signal from the amplifier 24 is then split into three separate paths, where the three split signals are applied to a separate comparator or operational amplifier 26, 28 and 30. The amplifiers 26, 28 and 30 can be any electrical device suitable for the purposes discussed herein. The threshold signals applied to the amplifiers 26, 28 and 30, and to the various amplifiers discussed below, are by way of a non-limiting example. The operational amplifier 26 also receives a threshold signal of zero volts so that each time the sine wave goes positive, the operational amplifier 26 provides an output pulse signal. Thus, the output of the operational amplifier 26 is a square-wave pulse clock signal, as shown in the second signal line of FIG. 4.

The second operational amplifier 28 also receives a two volt threshold signal, which is the value that the amplitude modulated sine wave goes above when the transmitted bit is a one. In other words, if a zero bit is being transmitted, then the amplified sine wave will not go above the two volt threshold, but when a one bit is transmitted, the threshold of the sine wave does go above two volts. The amplifier 28 provides an output for that portion of the modulated sine wave that is above two volts. The third signal line of FIG. 4 shows the output pulses of the amplifier 28. The output of the amplifier 28 is applied to a set input S of an R/S flip-flop 34, which sets the output of the flip-flop 34 high when the flip-flop 34 receives the output pulse from the amplifier 28. The flip-flop 34, as well as the other flip-flops discussed below, can be replaced with other suitable electrical components that operate consistent with the discussion herein as would be appreciated by those skilled in the art.

The amplifier 30 is an inverting amplifier that inverts the sine wave from the amplifier 24, as shown in the fourth signal line of FIG. 4. The inverted sine wave from the amplifier 30 is applied to an input of an operational amplifier 36 along with a threshold signal of 1.5 volts. The amplifier 36 creates an output pulse when the inverted sine wave, or the negative part of the original sine wave, is greater than 1.5 volts, as shown in the fifth signal line in FIG. 4. Thus, the amplifier 36 provides an output pulse for each cycle of the sine wave. This pulse is applied to the reset input R of the flip-flop 34 to make the output of the flip-flop 34 zero for each negative portion of the original sine wave. The flip-flop 34 thus generates the data stream shown in the sixth signal line of FIG. 4. Particularly, each time the output of the amplifier 28 sets the output of the flip-flop 34 high, generating the one bit, the output of the operational amplifier 36 resets the output of the flip-flop 34 low when the original sine wave goes negative, to be ready for the next one bit.

By generating the output of the flip-flop 34 in this manner, the data is read from the output of the flip-flop 34 at the falling edge of the clock signal at a time when the output of the flip-flop 34 is between the rising and falling edge of the one bit, where it is stable. In an alternate embodiment, the clock signal can be inverted, where the data at the output of the flip-flop 34 is read on the rising edge of the clock signal pulses. By using the sine wave to create the square wave timing pulses, the receiver circuit 20 follows the frequency of the incoming sine wave, even if it varies. In other words, variations in the sine wave frequency do not affect the ability of the receiver circuit 20 to extract the data signal therefrom.

Figure 5:
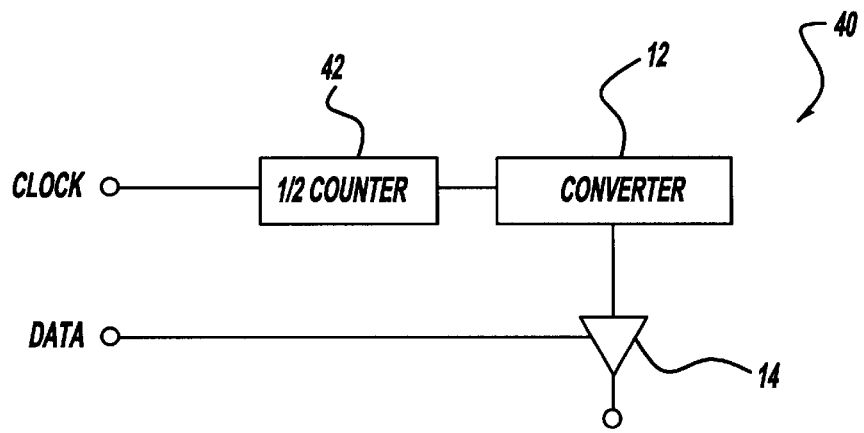
FIG. 5 is a schematic diagram of a modulator circuit for a transmitter, according to the invention, where a digital data bit is provided for each half cycle of the carrier wave.
Figure 6:
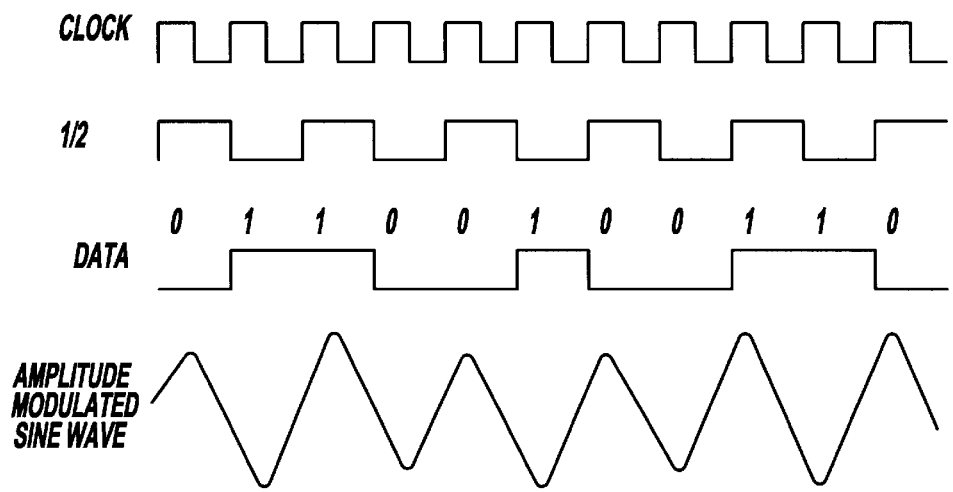
FIG. 6 is a plurality of signal lines for the modulator circuit shown in FIG. 5.

FIG. 5 is a schematic block diagram of another modulator circuit 40, according to the invention, that includes the same converter 12 and amplifier 14 as in the modulator circuit 10 discussed above, operating in the same manner. In this embodiment, a bit is transmitted every half cycle of the carrier wave. To provide this, the clock signal is divided in half by a divide-by-two counter 42 prior to being applied to the converter 12. FIG. 6 shows the same signal lines as in FIG. 2, including the clock output of the divide-by-two counter 42 in the second line.

Figure 7:
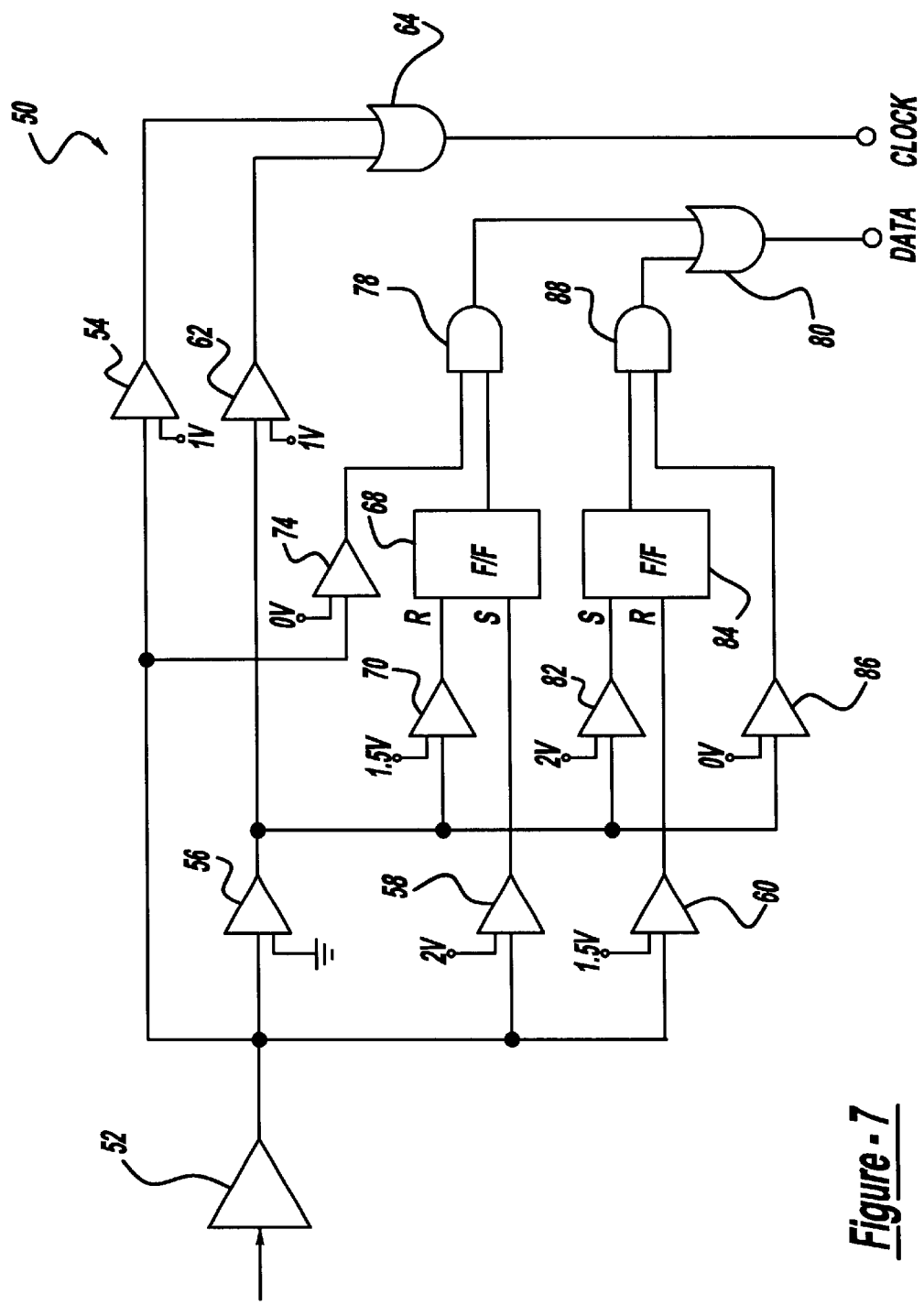
FIG. 7 is a schematic diagram of a demodulator circuit in a receiver, according to the invention, where the demodulator circuit extracts the clock and data signals modulated onto the carrier wave in FIG. 5.
Figure 8:
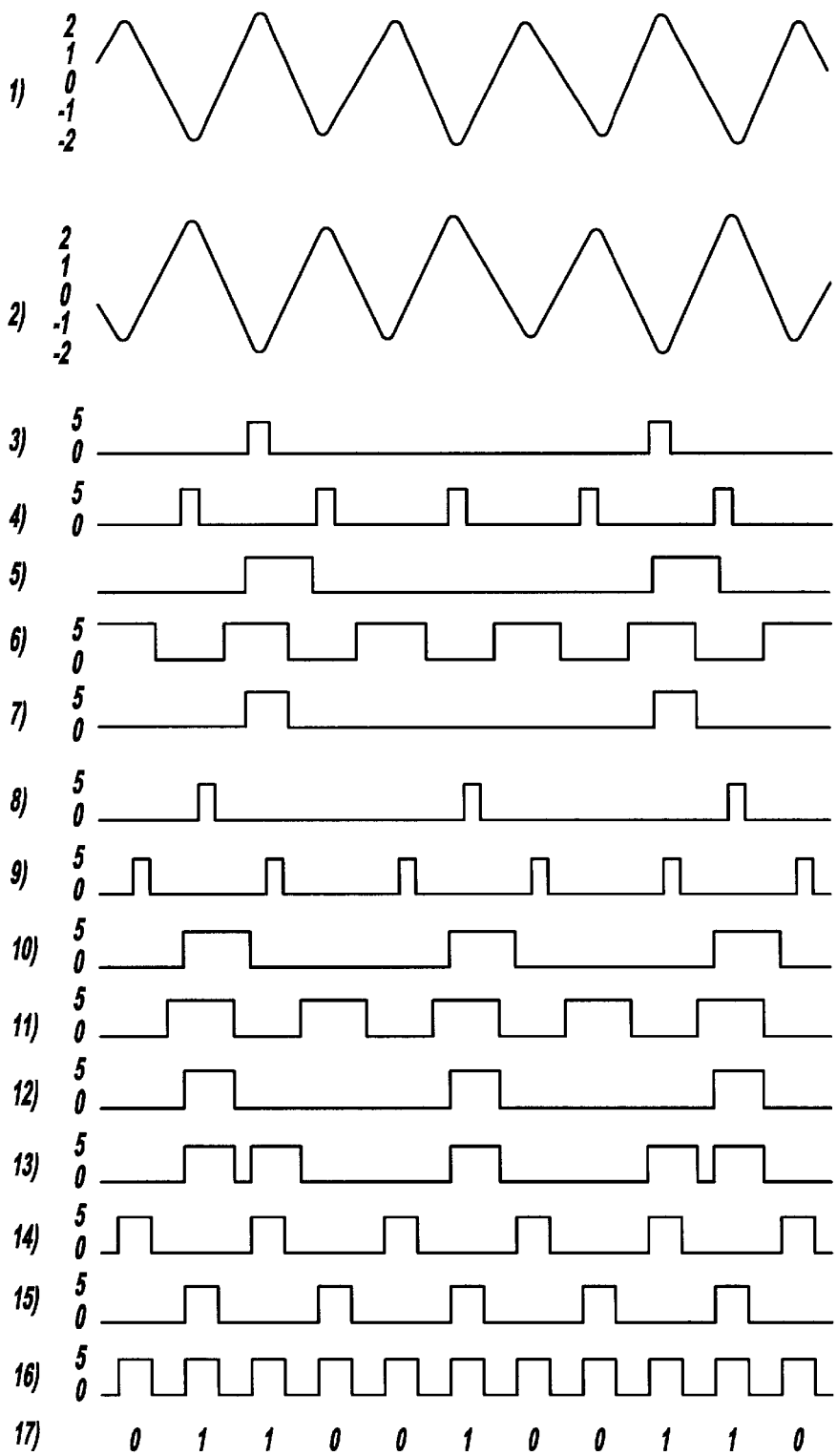
FIG. 8 is a plurality of signal lines for the demodulator circuit shown in FIG. 7.

FIG. 7 is a schematic diagram of a receiver circuit 50 that receives the modulated sine wave transmitted by the transmitter including the modulator circuit 40, and that separates the clock and data signals for communications processing. FIG. 8 shows a series of signal lines for different locations in the receiver circuit 50, as will be discussed below. The received signal is received by a receiver front-end circuit, as discussed above. The received signal is then sent to an AGC amplifier 52 to be amplified to a suitable level for subsequent signal processing. The output of the amplifier 52 is shown in signal line 1 of FIG. 8. The amplified signal is split into four signal paths and applied as one input to operational amplifiers 54, 56, 58 and 60, as shown.

The amplifier 54 also receives a one volt threshold input signal, and provides a pulse output each time the positive portion of the carrier wave goes above one volt, as shown in signal line 14 of FIG. 8. The amplifier 56 is an inverting amplifier that inverts the amplified sine wave, as shown in signal line 2 of FIG. 8. The inverted sine wave from the amplifier 56 is applied to an input of an operational amplifier 62. The other input of the amplifier 62 is a one volt threshold signal so that when the inverted sine wave (negative portion of the original sine wave) goes above one volt, the amplifier 62 provides an output pulse, as shown in line 15 of FIG. 8. Thus, the output of the amplifier 62 is the same signal output as the output of the amplifier 54, but 180° out of phase. The outputs of the amplifiers 54 and 62 are applied to an OR gate 64 that provides a pulsed output signal each time one of the inputs is high. Other logic gates or combinations of logic gates can be used, instead of the OR gate 64, or any of the logic gates discussed below, as would be appreciated by those skilled in the art. Therefore, the output of the OR gate 64 is the recreated clock signal at twice the frequency of the sine wave, as shown in signal line 16 of FIG. 8.

The amplifier 58 also receives a two volt threshold input signal and provides an output pulse each time the amplified sine wave goes above two volts, as shown in signal line 3 of FIG. 8. This pulse signal is applied to the set input S of an R/S flip-flop 68. The output of the inverting amplifier 56 is applied as an input to an operational amplifier 70 along with a 1.5 volt threshold input signal. Therefore, the output of the amplifier 70 is high when the negative portion of the original sine wave goes above 1.5 volts, or for every peak of the inverted sine wave, as shown in signal line 4 of FIG. 8. The output from the amplifier 70 is applied to the reset input R of the flip-flop 68. Thus, each time a one bit is transmitted on the positive portion of the carrier wave, the amplifier 58 will provide an output pulse and the output of the flip-flop 68 will go high, as shown in signal line 5 of FIG. 8. Then, for each negative peak of the sine wave, the flip-flop 68 is reset for the next one bit.

The amplified sine wave from the amplifier 52 is also provided as an input to an operational amplifier 74 along with a zero volt threshold input. Therefore, the output of the amplifier 74 is high for each positive portion of the original sine wave, as shown in line 6 of FIG. 8. The output of the amplifier 74 and the output of the flip-flop 68 are applied to an AND gate 78 that provides an output signal to an OR gate 80 each time both of its inputs are high, as shown in signal line 7 of FIG. 8. Thus, if a one bit is transmitted on the positive portion of the sine wave, the output of the AND gate 78 is high, providing a high data output at the output of the OR gate 80.

For the data bit on the negative portion of the original sine wave, the inverted sine wave from the amplifier 56 and a two volt threshold signal are applied as inputs to an amplifier 82. Thus, when the negative portion of the original sine wave is transmitting a one bit, the output of the amplifier 82 goes high, as shown in signal line 8 of FIG. 8, which is applied to the set input S of an R/S flip-flop 84. Each positive portion of the sine wave resets the flip-flop 84. Particularly, the sine wave from the amplifier 52 and a 1.5 volt threshold signal are provided as inputs to the amplifier 60, which provides an output pulse at the peaks of the positive portion of the sine wave, shown in signal line 9 of FIG. 8, that are applied to the reset input R of the flip-flop 84. Thus, when a one bit on the negative portion of the sine wave sets the output of the flip-flop 84 high, the positive portion of the sine wave resets the flip-flop 84 to low in anticipation of the next one bit on the negative portion of the original sine wave, as shown in signal line 10 of FIG. 8.

The inverted sine wave from the amplifier 56 is applied to an amplifier 86 along with a zero volt threshold input signal so that the output of the amplifier 86 is positive for each negative portion of the original sine wave, as shown in signal line 11 of FIG. 8. The output of the amplifier 86 and the output of the flip-flop 84 are applied to the inputs of an AND gate 88. Thus, every time a one bit is transmitted on the negative portion of the original sine wave, the output of the AND gate 88 is high, as shown in signal line 12 of FIG. 8, which is applied to the OR gate 80. Thus, the output of the OR gate 80 is high, indicating a one bit whenever a one bit is transmitted on the positive portion or the negative portion of the original sine wave, as shown in signal line 13 of FIG. 8. The data is read on the falling edge of the clock signal, and is shown in line 17 of FIG. 8.

Figure 9:
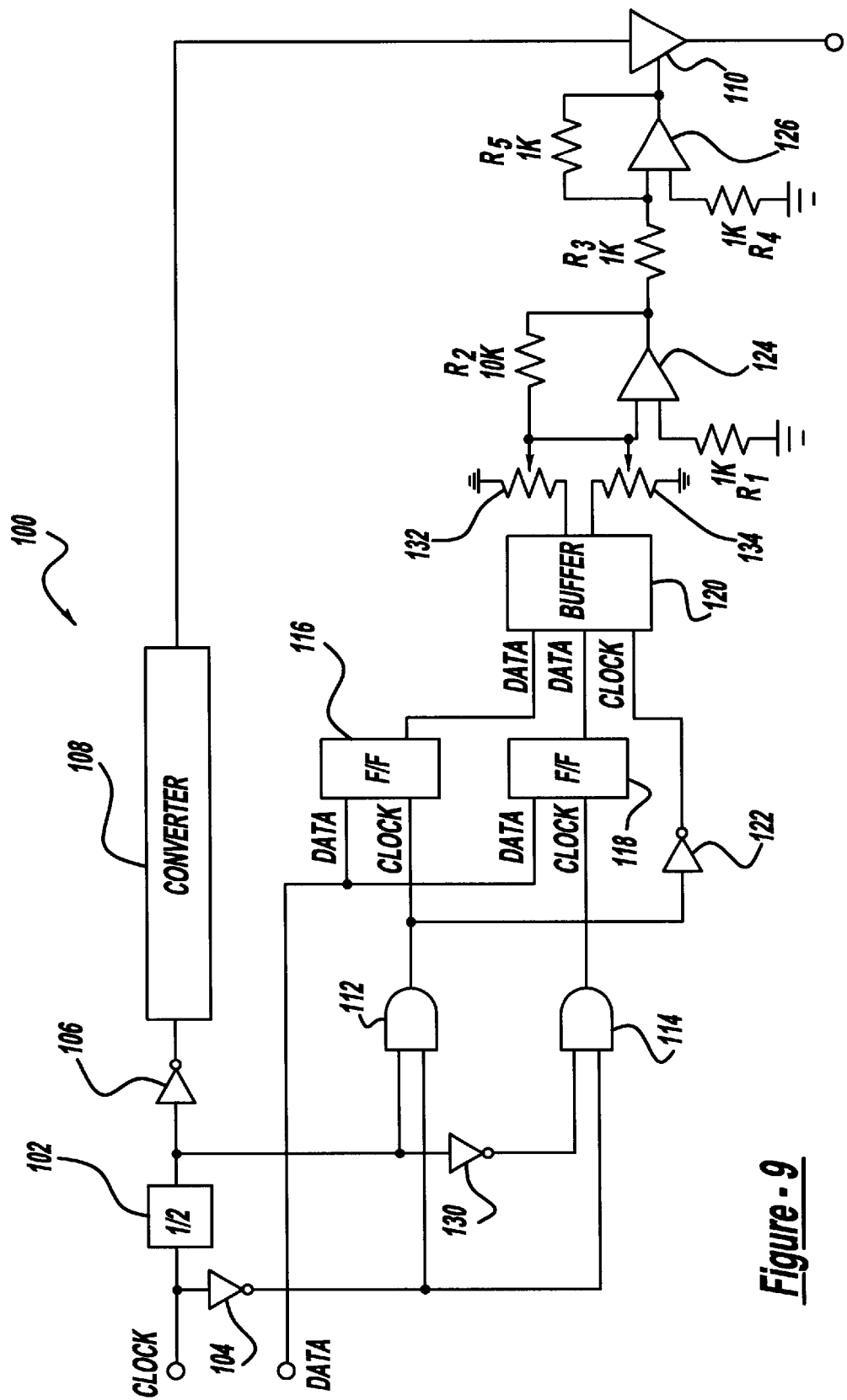
FIG. 9 is a schematic diagram of a modulator circuit for a transmitter, according to the invention, where a clock signal is converted to a carrier wave that is modulated by a digital data signal, where there are multiple digital data bits for each cycle of the carrier wave.
Figure 10:
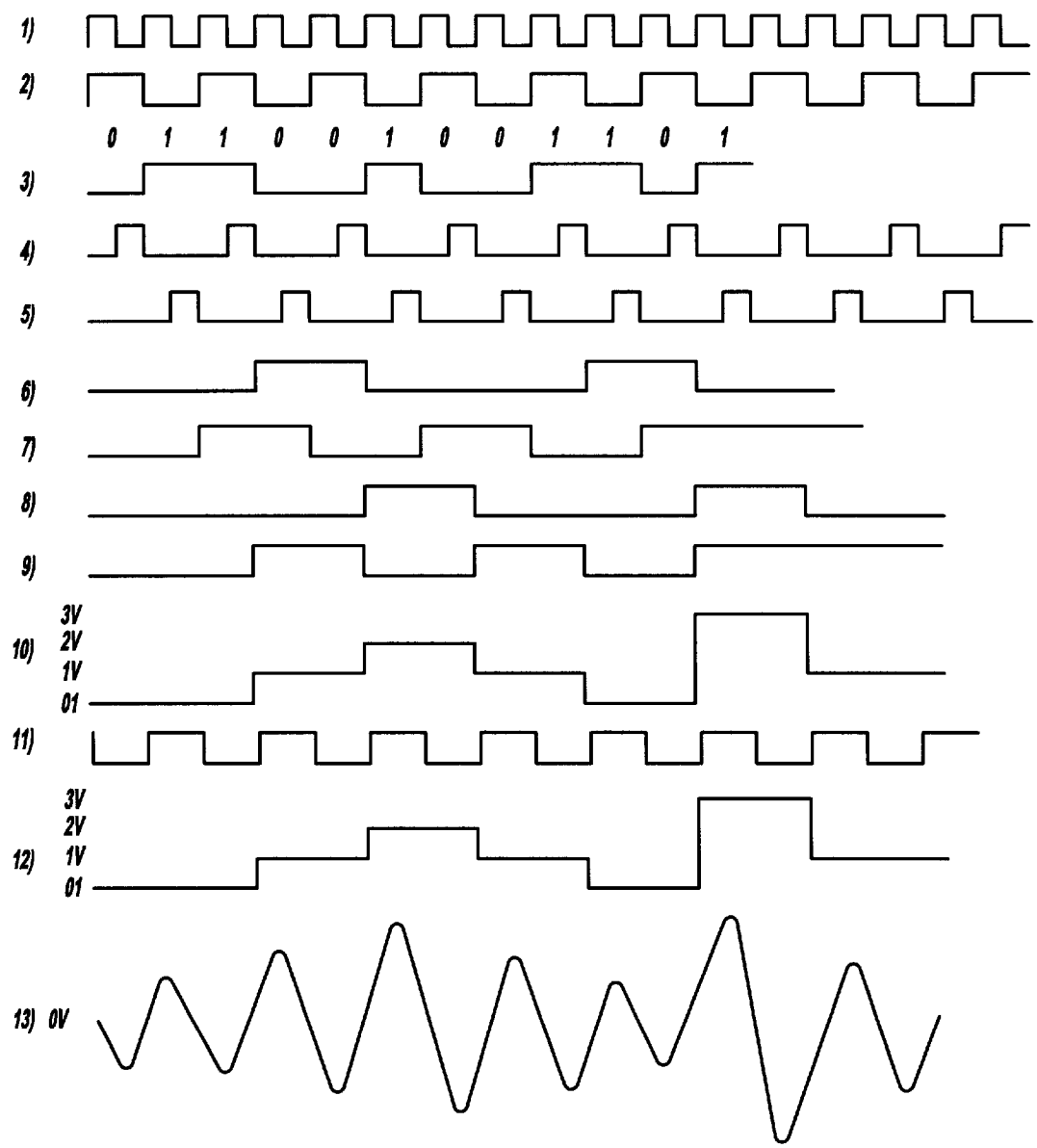
FIG. 10 is a plurality of signal lines for the modulator circuit shown in FIG. 9.

FIG. 9 is a schematic diagram of a modulator circuit 100 for a transmitter that transmits a carrier wave including multiple bits on the combination of the positive portion and the negative portion of each cycle of the sine wave. The same data stream of digital data bits 011001001101 is being transmitted, as discussed above. FIG. 10 shows various signal lines for different locations in the modulator circuit 100, as will be discussed below. In this embodiment, the modulator circuit 100 has two bits of resolution, represented as digital words 00, 01, 10 or 11, for transmitting the numbers 0, 1, 2 or 3, respectively. Different levels of amplitude modulation are provided for each of the digital words being transmitted, where the digital word 00 has no amplification. As will be appreciated by those skilled in the art, variations of the digital words being transmitted, different bit resolutions and different levels of signal amplification can be employed within the scope of the present invention.

The clock pulse signal, shown in signal line 1 of FIG. 10, is applied to a divide-by-two counter 102 and an inverter 104. The divided clock signal, shown in signal line 2 of FIG. 10, from the counter 102 is also applied to an inverter 106. The clock signal that has been divided by two and inverted, is then applied to a square wave-to-sine wave converter 108, as above, that converts the square pulse clock signal to a sine wave to be the carrier wave that is transmitted. The sine wave from the converter 108 is applied to an amplifier 110, whose gain is set by one of the digital words 00, 01, 10 or 11, as will be discussed in more detail below.

The inverted original clock pulse signal from the inverter 104 is applied to one input of two AND gates 112 and 114. The divided clock pulse signal from the divider 102 is applied to the other input of the AND gate 112 and to an inverter 130. The inverted and divided clock pulse signal from the inverter 130 is applied to the other input of the AND gate 114. When the negative portion of the original clock signal and the positive portion of the divided clock signal are both high, the output of the AND gate 112 is high, as shown in signal line 4 of FIG. 10. Likewise, when the negative portion of the original clock signal and the negative portion of the divided clock signal are both high, the output of the AND gate 114 is high, as shown in signal line 5 of FIG. 10. Therefore, the combination of the outputs of the AND gates 112 and 114 provide alternating square-wave clock pulses that are used for timing purposes.

The output of the AND gate 112 is a clock input to a flip-flop 116 and the output of the AND gate 114 is a clock input to a flip-flop 118. The data stream being transmitted, shown in line 3 of FIG. 10, is applied to the data inputs of the flip-flops 116 and 118. The flip-flops 116 and 118 read the data on the rising edge of the clock pulses from the AND gates 112 and 114, respectively, and then transfer the data to their outputs at the falling edge of the clock pulses to the flip-flops 116 and 118. Therefore, the flip-flop 116 provides output pulses of the last data bit at the falling edge of the clock signal from the AND gate 112, as shown in signal line 6 of FIG. 10. Likewise, the flip-flip 118 provides output pulses of the last data bit at the falling edge of the clock signal from the AND gate 114, as shown in signal line 7 of FIG. 10.

The output of the flip-flop 116 is applied to one data input of a buffer 120 and the output of the flip-flop 118 is applied to another data input of the buffer 120. In one example, the buffer 120 is a first-in first-out (FIFO) buffer, but other buffers can also be used. The output of the AND gate 112 is applied to an inverter 122, and the inverted output of the AND gate 112 is applied to a clock input of the buffer 120. Each time a clock pulse is received at the buffer 120, both of the data signals at the output of the flip-flops 116 and 118 are simultaneously passed through the buffer 120, as shown in signal lines 8 and 9, respectively, of FIG. 10. The output of the buffer 120 is applied to one input of a summing amplifier 124 through variable resistors 132 and 134. The resistor 132 is set to provide a one volt potential and the resistor 134 is set to provide a two volt potential. The other input of the amplifier 124 is tied to ground through resistor $R_1$.

For those clock pulses that neither of the data inputs to the buffer 120 are high (00), the amplifier 124 does not provide an output signal. For those clock pulses that the output of the flip-flop 116 is high and the output of the flip-flop 118 is low (01), the signal applied to the input of the amplifier 124 through the buffer 120 is set by the resistor 132 to provide a first level of amplification. For those clock pulses that the output of the flip-flop 116 is low and the output of the flip-flop 118 is high (10), the signal applied to the input of the amplifier 124 through the buffer 120 is set by the resistor 134 to provide a second level of amplification. For those clock pulses where the output of the flip-flop 116 and the flip-flop 118 are both high (11), the signal applied to the input of the amplifier 124 through the buffer 120 is set by both of the resistors 132 and 134 to provide a third level of amplification. In the example provided herein, the amplifier 124 outputs zero volts for (00); one volt for (01); two volts for (10) and three volts for (11). However, this is by way of a non-limiting example, in that other voltage levels can be used to distinguish the two-bit digital words. The output of the amplifier 124 is shown in signal line 10. Further, as would be appreciated by those skilled in the art, the circuit 100 could be expanded to transmit more bits per cycle for a higher resolution.

Because the amplifier 124 is an inverting amplifier, the output of the amplifier 124 is applied to another inverting amplifier 126 that inverts the signal from the amplifier 124, as shown in signal line 12 of FIG. 10. The output of the amplifier 126 is the gain input to the amplifier 110, so that the sine wave from the converter 108 is either not amplified, or amplified to one of a first, second or third level, as shown in signal line 13 of FIG. 10.

Figure 11:
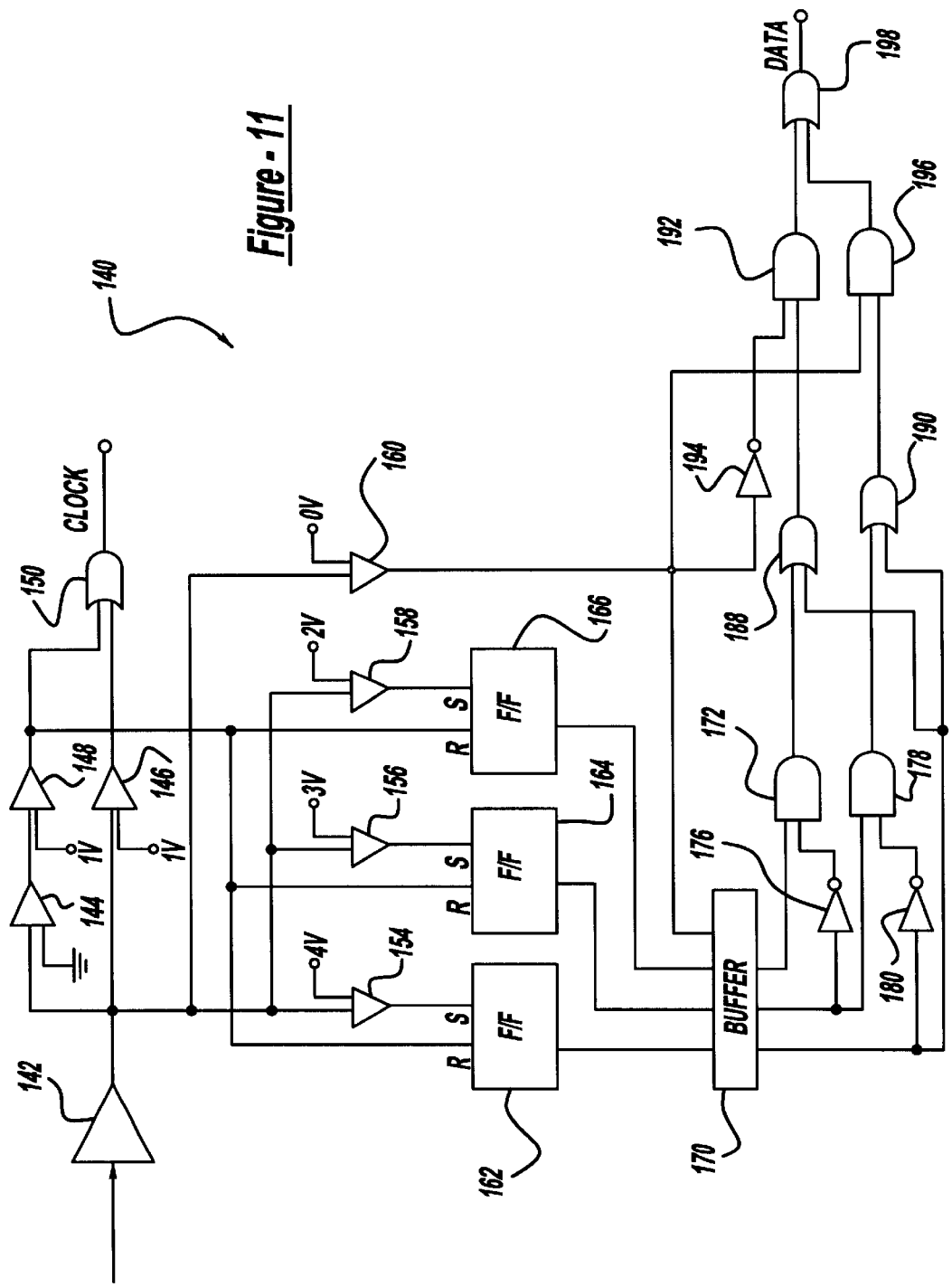
FIG. 11 is a schematic diagram of a demodulator circuit in a receiver, according to the invention, where the demodulator circuit extracts the clock and data signals modulated onto the carrier wave in FIG. 9.

FIG. 11 is a schematic diagram of a receiver circuit 140, according to another embodiment of the present invention, that extracts the clock and data signals modulated onto the sine wave transmitted by the modulator circuit 100 in FIG. 9. The received signal is then sent to an AGC amplifier 142 to be amplified to a suitable level for subsequent signal processing. The amplified signal from the amplifier 142 is applied to an inverting amplifier 144 and one input of an operational amplifier 146. A one volt signal is applied to the other input of the amplifier 146. Thus, for each positive portion of the sine wave, the amplifier 146 provides an output pulse. The inverted signal from the amplifier 144 is applied to one input of an operational amplifier 148, and a one volt signal is applied to the other input of the amplifier 148. Thus, for each negative portion of the sine wave, the amplifier 148 provides an output pulse. The outputs of the amplifiers 146 and 148 are applied to an OR gate 150 that provides an output pulse for each positive and negative portion of the carrier wave, and thus recreates the original clock signal before it was divided by the counter 102.

The signal from the amplifier 142 is also applied to one input of four operational amplifiers 154, 156, 158 and 160. A four volt signal is applied to the other input of the amplifier 154, a three volt signal is applied to the other input of the amplifier 156, a two volt signal is applied to the other input of the amplifier 158, and a zero volt signal is applied to the other input of the amplifier 160. Therefore, whenever the amplified sine wave goes positive, the amplifier 160 provides an output pulse, and every time the sine wave goes above two volts, the amplifier 158 provides an output pulse, and every time the sine wave goes above three volts, the amplifier 156 provides an output pulse, and every time the sine wave goes above four volts, the amplifier 154 provides an output pulse. Thus, when a 00 bit word is transmitted, none of the amplifiers go high, when a 01 bit word is transmitted, the amplifier 158 goes high, when a 10 bit word is transmitted, both the amplifiers 156 and 158 go high, and when a 11 bit word is transmitted, all of the amplifiers 154,156 and 158 go high.

The output of the amplifier 154 is applied to the set (S) input of a flip-flop 162 and the output of the amplifier 148 is applied to the reset input (R) of the flip-flop 162. The output of the amplifier 156 is applied to the set (S) input of a flip-flop 164 and the output of the amplifier 148 is applied to the reset input (R) of the flip-flop 164. The output of the amplifier 158 is applied to the set (S) input of a flip-flop 166 and the output of the amplifier 148 is applied to the reset input (R) of the flip-flop 166. Thus, when a 11 bit word is transmitted, the output of the flip-flop 162 is set high, and then is reset to zero when the negative portion of the sine wave goes above one volt. Likewise, when a 10 bit word is transmitted, the output of the flip-flop 164 goes high, and then is reset to zero when the negative portion of the sine wave goes above one volt. Also, the output of the flip-flop 166 goes high when a 01 bit word is transmitted, and the flip-flop 166 is reset when the negative portion of the sine wave goes above one volt. In this configuration, all of the outputs of the flip-flops 162, 164 and 166 are high when a 11 bit word is transmitted, the output of the flip-flops 164 and 166 are high when a 10 bit word is transmitted, but the output of the flip-flop 162 is low, and the output of the flip-flop 166 is high and the outputs of the flip-flops 162 and 164 are low when a 01 bit word is transmitted.

The outputs from the flip-flops 162,164 and 166 are applied as data inputs to a FIFO buffer 170, and the output of the amplifier 160 is applied as a clock signal to the buffer 170. Each time the clock signal from the amplifier 160 goes high, the signals at the outputs of the flip-flops 162–166 are simultaneously transferred to the output of the buffer 170.

The output of the flip-flop 166 is transferred through the buffer 170 to one input of an AND gate 172. The output of the flip-flop 164 is transferred through the buffer 170 and through an inverter 176 to the other input of the AND gate 172, and through the buffer 170 to one input of an AND gate 178. The output of the flip-flop 162 is transferred through the buffer 170 and through an inverter 180 to the other input of the AND gate 178.

When the 01 bit word is transmitted, both inputs to the AND gate 172 are high, and thus the output of the AND gate 172 is high. When the 10 bit word is transmitted, the inverted input to the AND gate 172 is low, so the output of the AND gate 172 is low, but both inputs to the AND gate 178 are high, so the output of the AND gate 178 is high. When the 11 bit word is transmitted, both of the inverted inputs to the AND gates 172 and 178 are low, and thus the outputs of the AND gates 172 and 178 are low. The output of the flip-flop 162 is transferred through the buffer 170 to one of the inputs of a pair of OR gates 188 and 190. The other input of the OR gate 188 is the output of the AND gate 172, and the other input of the OR gate 190 is the output of the AND gate 178, as shown.

Therefore, when the outputs of the OR gates 188 and 190 are low, a 00 bit word is being transmitted. When the output of the OR gate 188 is high, and the output of the OR gate 190 is low, a 01 bit word is being transmitted. When the output of the OR gate 188 is low and the output of the OR gate 190 is high, a 10 bit word is being transmitted. When both of the outputs of the OR gates 188 and 190 are high, a 11 bit word is being transmitted.

The output of the amplifier 160 is applied through an inverter 194 to one input of an AND gate 192, and the output of the OR gate 188 is applied to the other input of the AND gate 192. The output of the amplifier 160 is also applied to one input of an AND gate 196, and the output of the OR gate 190 is applied to the other input of the AND gate 196. The output of the AND gates 192 and 196 are applied as inputs to an OR gate 198, which is the data output.

When a 1 bit is being transmitted on a negative portion of the sine wave, the output of the AND gate 192 is high. Further, when a 1 bit is being transmitted on the positive portion of the sine wave, the output of the AND gate 196 is high. When either of the outputs of the AND gates 192 or 196 is high, the output of the OR gate 198 is high. Thus, when the 00 bit word is being transmitted, the outputs of the AND gates 192 and 196 are low, and the output of the OR gate 198 is low. When the 01 bit word is being transmitted, the output of the AND gate 192 is high and the output of the AND gate 196 is low, and the output of the OR gate 198 is high. The positive portion of the cycle transmits the least significant bit (LSB). When the 10 bit word is being transmitted, the output of the AND gate 192 is low and the output of the AND gate 196 is high, and the output of the OR gate 198 is high. When the 11 bit word is being transmitted, both of the outputs of the AND gates 192 and 196 are high, and the output of the OR gate 198 is high.

Figure 12:
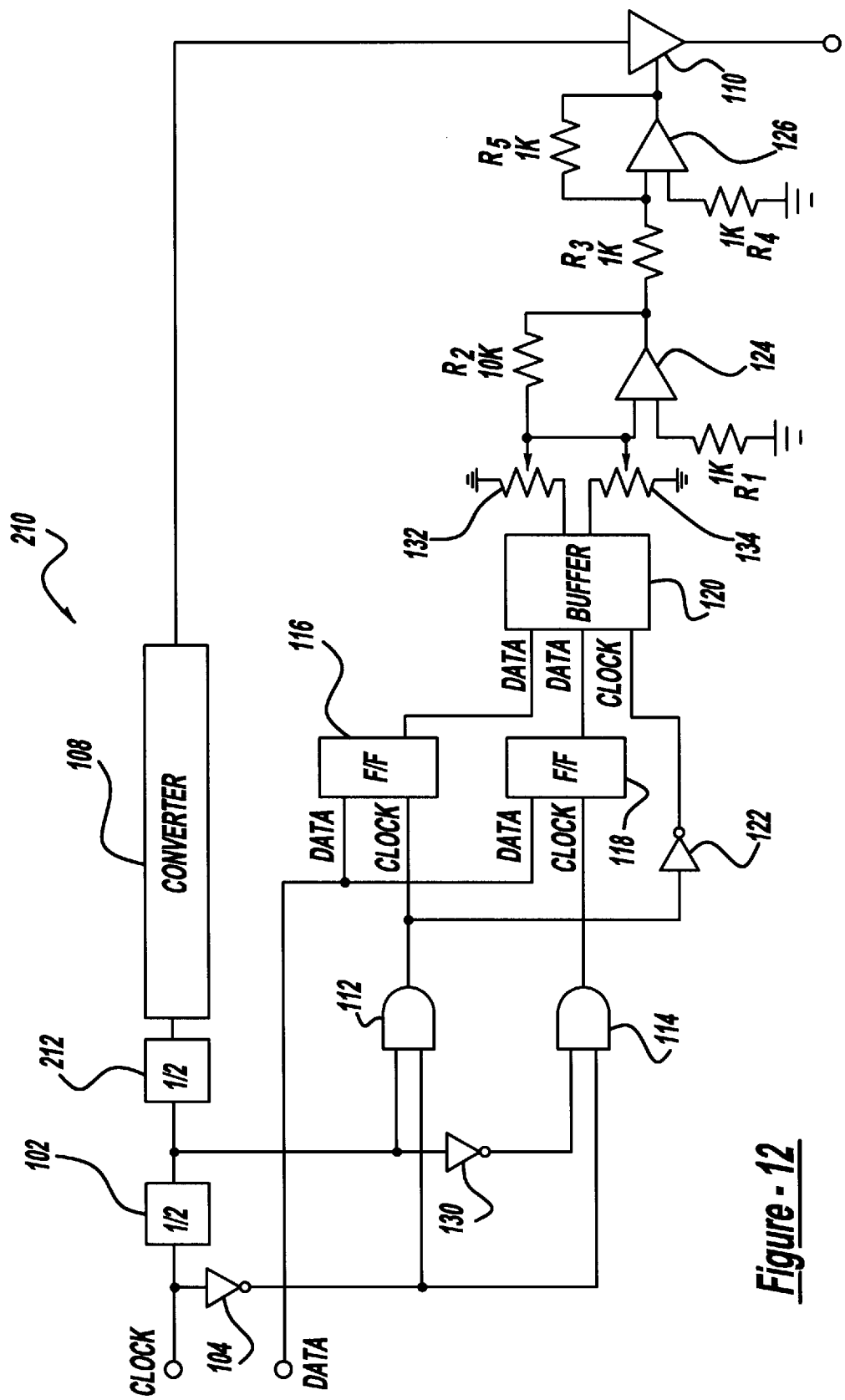
FIG. 12 is a schematic diagram of a modulator circuit for a transmitter, according to the invention, where a clock signal is converted to a carrier wave that is modulated by a digital data signal, and where there are multiple digital data bits for each half cycle of the carrier wave.
Figure 13:
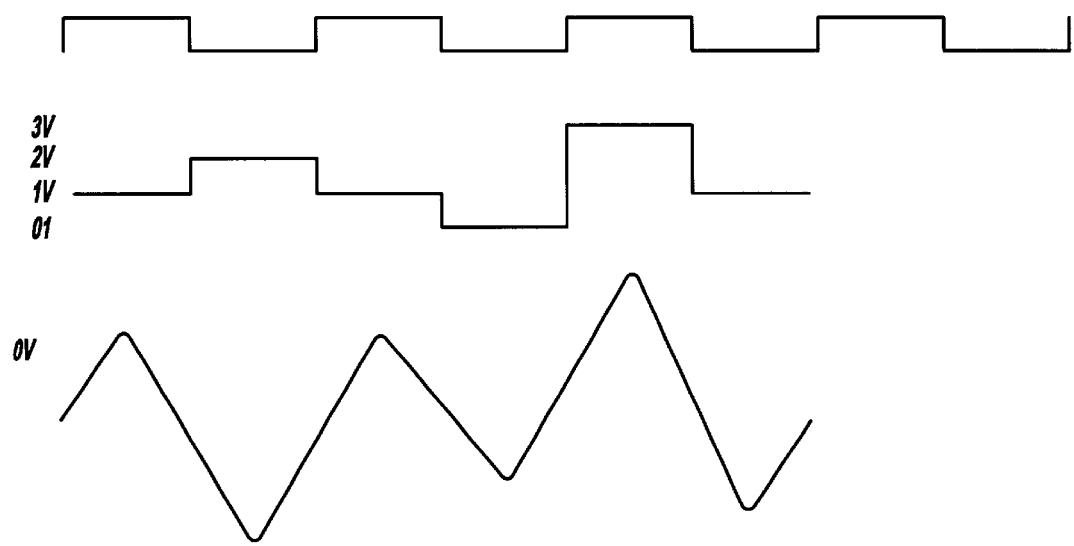
FIG. 13 is a plurality of signal lines for the modulator circuit shown in FIG. 12.

FIG. 12 is a schematic diagram of a modulator circuit 210 for a transmitter that transmits a sine wave including multiple bits for both the positive portion and the negative portion of each cycle of the sine wave. The modulator circuit 210 is nearly identical to the modulator circuit 100 discussed above, where like components are identified with the same reference numeral, except that the modulator circuit 210 employs a second divide-by-two counter 212 that further divides the clock input signal in half. Therefore, the output of the amplifier 110 is one-half the frequency as the amplifier 110 in the modulator circuit 100. This allows two bits to be transmitted for each half-cycle. FIG. 13 shows a few of the signal lines for the circuit 210 not shown in FIG. 10. In this embodiment, the modulator circuit 210 includes two bits of resolution per each half cycle of the carrier wave, represented as digital words 00, 01, 10 or 11, instead of two bits of resolution for each full cycle as in the modulator circuit 100. In other embodiments, the clock signal can be divided further to transmit more bits per cycle or half-cycle.

Figure 14:
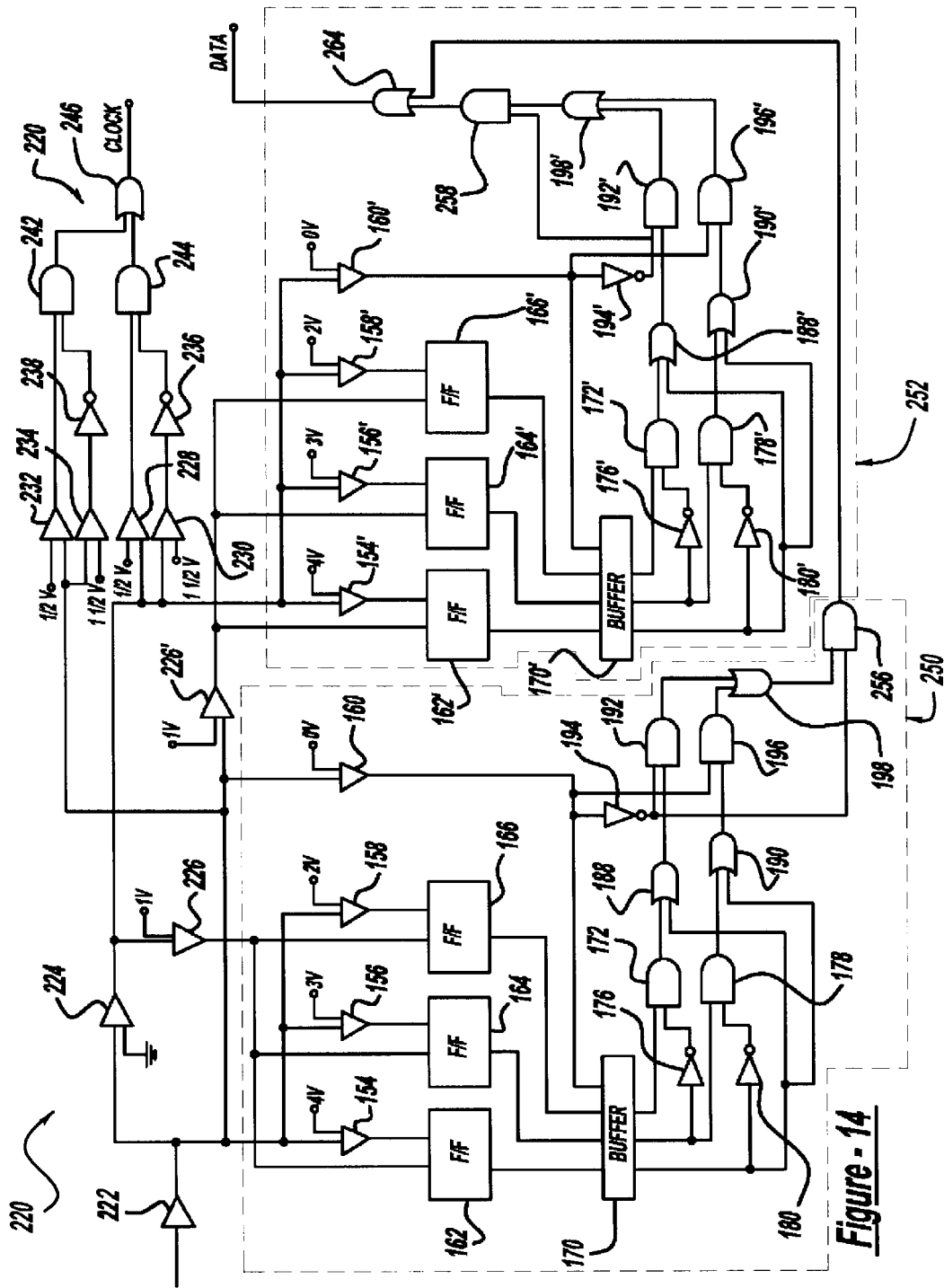
FIG. 14 is a schematic diagram of a demodulator circuit in a receiver, according to the invention, where the demodulator circuit extracts the clock and data signals modulated onto the carrier wave in FIG. 12.

FIG. 14 is a schematic diagram of a receiver circuit 220, according to another embodiment of the present invention, that extracts the clock and data signals modulated onto the sine wave transmitted by the modulator circuit 210 in FIG. 12. In this example, the receiver circuit 220 extracts two bits per every half-cycle of the sine wave.

In this embodiment, the received sine wave is quadrupled in frequency to recreate the original clock signal. The received sine wave is amplified by an AGC amplifier 222. The amplified signal from the amplifier 222 is applied to an inverting amplifier 224, and the inverted sine wave is applied to an operational amplifier 226 in the same manner as discussed above for the circuit 140. Additionally, the inverted sine wave is applied to operational amplifiers 228 and 230, where the other input of the amplifier 228 is 0.5 volts and the other input of the amplifier 230 is 1.5 volts. Likewise, the uninverted sine wave is applied to operational amplifiers 232 and 234, where the other input of the amplifier 232 is 0.5 volts and the other input of the amplifier 234 is 1.5 volts. The output of the amplifier 230 is inverted by an inverter 236 and the output of the amplifier 234 is inverted by an inverter 238. The output of the amplifier 232 and the inverter 238 are applied to an AND gate 242, and the output of the amplifier 228 and the inverter 236 are applied to an AND gate 244. The outputs of the AND gates 242 and 244 are applied to an OR gate 246, whose output is the clock signal in the circuit 220. Based on this design, the various amplifiers, inverters and logic gates provide an output pulse for each quarter of the original sine wave for both the positive and negative portions of the cycle, providing the quadrupled clock speed of the original clock signal from the received sine wave.

The modulated sine wave from the amplifier 222 and the output of the amplifier 226 are applied to an extraction circuit 250 that includes the data extraction part of the circuit 140, discussed above, where like reference numerals are labeled the same. Because the operation of the extraction circuit 250 is discussed above, a detailed discussion of this portion of the circuit 220 will not be given. It should be noted that the extraction circuit 250 extracts the data on the positive portion of the modulated sine wave from the amplifier 222, or two bits.

An extraction circuit 252 is provided for extracting the bits on the negative portion of the modulated sine wave, and includes the same elements as the extraction circuit 250, but identified with a prime. Therefore, the extraction circuit 252 will also not be discussed in detail.

The circuit 220 includes an AND gate 256 in the extraction circuit 250 that receives an input from the OR gate 198 and an input from the inverter 194. Thus, the output of the AND gate 256 is only high when the sine wave is on the positive portion of the cycle and includes a one bit. Likewise, the circuit 220 includes an AND gate 258 in the extraction circuit 252 that receives an input from the OR gate 198 and the inverter 194. Thus, the AND gate 258 is only high when the sine wave is on the negative portion of the cycle and includes a one bit. The outputs of the AND gates 256 and 258 are applied to an OR gate 264 that provides a high output for each one bit that is transmitted on both the positive and negative portions of the sine wave.

The discussion above describes various transmitter circuits that synchronize clock and data signals onto a common carrier wave, and various receiver circuits that extract the clock and data signals from the carrier wave. These circuits allow more bits to be transmitted per cycle of the carrier wave than was heretofore known in the art. Additionally, because the clock and data signals are synchronized, carrier wave bandwidth can be better utilized in that more carrier wave frequencies can be used for other data channels. Also, variations in the carrier wave frequency from crystal limitations do not affect the data on the resulting carrier wave. It is stressed that the specific components and voltage values used in the circuits discussed herein do not limit the invention. Other circuit components and values, including calculations made in software, can also be used.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A receiver circuit for receiving an amplitude modulated and sine wave and separating a pulsed clock signal and a digital data stream from the sine wave, said receiver circuit comprising a plurality of electrical components including a plurality of comparator devices and at least one logic device, each comparator device receiving a predetermined threshold signal and a circuit signal, where the circuit signal for several of the plurality of comparator devices is the sine wave, wherein one of the comparator devices or at least one logic device outputs the pulsed clock signal and at least one logic device outputs the data stream, and wherein each cycle of the modulated sine wave includes at least one digital bit in the data stream, and wherein the separated clock signal is the clock signal used in the receiver circuit for extracting digital data from the data stream.

2. The circuit according to claim 1 wherein each cycle of the modulated sine wave includes exactly one digital data bit in the data stream.

3. The circuit according to claim 1 wherein each half-cycle of the modulated sine wave includes at least one digital data bit in the data stream.

4. The circuit according to claim 1 wherein each cycle of the modulated sine wave includes a plurality of digital bits in the data stream.

5. The circuit according to claim 4 wherein each cycle of the modulated sine wave includes a two bit digital word.

6. The circuit according to claim 1 wherein each half-cycle of the modulated sine wave includes a plurality of digital bits in the data stream.

7. The circuit according to claim 6 wherein each half-cycle of the modulated sine wave includes a two bit digital data word.

8. The circuit according to claim 1 wherein the plurality of comparator devices includes a first comparator device, a second comparator device, a third comparator device and a fourth comparator device, and wherein the at least one logic device includes a flip-flop device.

9. The circuit according to claim 8 wherein the first comparator device is responsive to the modulated sine wave and a first predetermined threshold signal, said first comparator device outputting the pulsed clock signal.

10. The circuit according to claim 8 wherein the second comparator device is responsive to the modulated sine wave and a second predetermined threshold signal, said second comparator device outputting a pulse signal each time a positive portion of the modulated sine wave goes above the second predetermined threshold.

11. The circuit according to claim 8 wherein the third comparator device is responsive to the modulated sine wave, said third comparator device outputting an inverted modulated sine wave.

12. The receiver according to claim 11 wherein the fourth comparator device is responsive to the inverted modulated sine wave and a third predetermined threshold signal, said fourth comparator device outputting a pulse signal having positive pulses for each negative portion of the modulated sine wave applied to the third comparator device.

13. The circuit according to claim 12 wherein the flip-flop device receives a reset input from the fourth comparator device and a set input from the second comparator device, said flip-flop device outputting the data stream.

14. The circuit according to claim 1 further comprising an inverting device responsive to the modulated sine wave, said inverting device inverting the modulated sine wave, wherein the plurality of comparator devices include a first comparator device responsive to the modulated sine wave and a first predetermined threshold signal, said first comparator device outputting a first pulse signal, and a second comparator device responsive to the inverted modulated sine wave and a second predetermined threshold signal, said second comparator device outputting a second pulse signal, and wherein the at least one logic device includes a logic gate responsive to the first pulse signal and the second pulse signal, said logic gate outputting the pulsed clock signal.

15. The circuit according to claim 1 further comprising an inverting device responsive to the modulated sine wave, said inverting device inverting the modulated sine wave, wherein the plurality of comparator devices include a first comparator device responsive to the modulated sine wave and a first threshold signal, said first comparator device outputting a first set pulse signal, a second comparator device responsive to the inverted modulated sine wave and a second threshold signal, said second comparator device outputting a first reset pulse signal, a third comparator device responsive to the modulated sine wave and a third threshold signal, said third comparator device outputting a first pulse signal for each positive portion of the modulated sine wave, a fourth comparator device responsive to the modulated sine wave and a fourth threshold signal, said fourth comparator device outputting a second reset pulse signal, a fifth comparator device responsive to the inverted modulated sine wave and a fifth threshold signal, said fifth comparator device outputting a second set pulse signal, and a sixth comparator device responsive to the inverted modulated sine wave and a sixth threshold signal, said sixth comparator device outputting a second pulse signal for each negative portion of the non-inverted modulated sine wave.

16. The circuit according to claim 15 wherein the at least one logic device includes a first flip-flop device responsive to the first set signal and the first reset signal and outputting the first set signal, said first reset signal resetting the first flip-flop device to zero for each pulse of the first reset pulse signal, said at least one logic device further including a first logic gate responsive to the first set signal from the first flip-flop device and the first pulse signal from the third comparator device, said first logic gate outputting a high signal when both the first pulse signal and the first set signal from the first flip-flop device are high, said at least one logic device further including a second flip-flop device responsive to the second set pulse signal and the second reset pulse signal, said second flip-flop device outputting the second set pulse signal and the second reset pulse signal resetting the output of the second flip-flop device to zero each time the second reset pulse signal is high, said at least one logic device further including a second logic gate responsive to the second set pulse signal from the second flip-flop device and the second pulse signal from the sixth comparator device, said second logic gate outputting a high signal when both the second set pulse signal from the second flip-flop device and the second pulse signal from the sixth comparator device are high.

17. The circuit according to claim 16 wherein the at least one logic device includes a third logic gate responsive to the outputs from the first and second logic gates, said third logic gate providing a third pulse output each time either of the outputs of the first or second logic gates is high, wherein an output of the third logic gate is the digital data stream.

18. The circuit according to claim 17 wherein the first and second logic gates are AND gates and the third logic gate is an OR gate.

19. The circuit according to claim 1 further comprising an inverting device responsive to the modulated sine wave, said inverting device inverting the modulated sine wave, wherein the plurality of comparator devices includes a first comparator device responsive to the inverted modulated sine wave and a first predetermined threshold signal, said first comparator device outputting a first pulse signal, a second comparator device responsive to the modulated sine wave and a second predetermined threshold signal, said first comparator device outputting a second pulse signal, a third comparator device responsive to the modulated sine wave and a third predetermined threshold signal, said third comparator device outputting a third pulse signal, a fourth comparator device responsive to the modulated sine wave and a fourth threshold signal, said fourth comparator device outputting a fourth pulse signal, and a fifth comparator device responsive to the modulated sine wave and a fifth threshold signal, said fifth comparator device outputting a fifth pulse signal.

20. The circuit according to claim 19 wherein the third threshold signal is greater than the second threshold signal, the fourth threshold signal is greater than the third threshold signal and the fifth threshold signal is greater than the fourth threshold signal.

21. The circuit according to claim 19 wherein the at least one logic device includes a plurality of flip-flop devices, said plurality of flip-flop devices including a first flip-flop device responsive to the third pulse signal at a set input of the first flip-flop device and the first pulse signal at a reset input of the first flip-flop device, said first flip-flop device outputting a pulse each time the modulated sine wave goes above the third threshold signal, a second flip-flop device responsive to the fourth pulse signal at a set input of the second flip-flop device and the first pulse signal at a reset input of the second flip-flop device, said second flip-flop device outputting a pulse each time the modulated sine wave goes above the fourth threshold signal, and a third flip-flop device responsive to the fifth pulse signal at a set input of the third flip-flop device and the first pulse signal at a reset input of the third flip-flop device, said third flip-flop device outputting a pulse each time the modulated sine wave goes above the fifth threshold signal.

22. The circuit according to claim 21 further comprising a buffer responsive to the outputs of the first, second and third flip-flop devices and the second pulse signal, said buffer outputting the outputs from the first, second and third flip-flop devices each time it receives a pulse from the second pulse signal.

23. The circuit according to claim 22 wherein the buffer is a first-in first-out buffer.

24. The circuit according to claim 22 wherein the at least one logic device includes a plurality of logic gates, said plurality of logic gates including a first logic gate responsive to the output of the first flip-flop device from the buffer and an inverted output of the second flip-flop device from the buffer, said first logic gate outputting a high signal each time both of its inputs are high, a second logic gate responsive to the output of the second flip-flop device from the buffer and an inverted output of the third flip-flop device from the buffer, said second logic gate outputting a high signal when both of its inputs are high, a third logic gate responsive to the output of the second logic gate and an output of the third flip-flop device from the buffer, said third logic gate outputting a high signal when one or both of its inputs are high, a fourth logic gate responsive to the output of the second logic gate and the output of the third flip-flop device from the buffer, said fourth logic gate outputting a high signal when one or both of its inputs are high, a fifth logic gate responsive to the output of the third logic gate and an inverted second pulse signal from the second comparator device, said fifth logic gate outputting a high signal when both of its inputs are high, a sixth logic gate responsive to the output of the fourth logic gate and the second pulse signal, said sixth logic gate outputting a high signal when both of its inputs are high, and a seventh logic gate responsive to the outputs of the fifth and sixth logic gates, said seventh logic gate outputting a high signal when either of its inputs are high, said seventh logic gate outputting the digital data stream.

25. The circuit according to claim 24 wherein the first, second, fifth and sixth logic gates are AND gates, and the third, fourth and seventh logic gates are OR gates.

26. A receiver circuit for receiving a modulated sine wave and separating a pulsed clock signal and a digital data stream from the sine wave, said receiver circuit comprising:

a first comparator device responsive to the modulated sine wave and a first predetermined threshold signal, said first comparator device outputting the pulsed clock signal;

a second comparator device responsive to the modulated sine wave and a second predetermined threshold signal, said second comparator device outputting a pulse signal each time a positive portion of the modulated sine wave goes above the second predetermined threshold;

a third comparator device responsive to the modulated sine wave, said third comparator device outputting an inverted modulated sine wave;

a fourth comparator device responsive to the inverted modulated sine wave and a third predetermined threshold signal, said fourth comparator device outputting a pulse signal having positive pulses for each negative portion of the modulated sine wave applied to the third comparator device; and a logic device including a first input and a second input, said first input being responsive to the pulse signal from the second comparator device and said second input being responsive to the pulse signal from the fourth comparator device, said logic device outputting the data stream including a positive pulse each time the second comparator device outputs a positive pulse so that each cycle of the modulated sine wave identifies a bit in the data stream.

27. The circuit according to claim 26 wherein the second input to the logic device is a reset input that resets the output of the logic device to zero.

28. The circuit according to claim 27 wherein the preset input sets the output of the logic device to zero for each negative portion of the sine wave.

29. The circuit according to claim 27 wherein the logic device is a flip-flop device, where the first input is a set input of the flip-flop device and the second input is a reset input to the flip-flop device.

30. The circuit according to claim 26 wherein the logic device outputs the data bits in the digital data stream on a falling edge of the pulsed clock signal.

31. The circuit according to claim 26 wherein the first threshold signal is about zero volts and the third threshold signal is less than the second threshold signal.

32. The circuit according to claim 26 wherein the second threshold signal is about two volts and the third threshold signal is about 1.5 volts.

33. The circuit according to claim 26 further comprising an automatic gain controlled amplifier, said automatic gain controlled amplifier being responsive to the modulated sine wave and amplifying the modulated sine wave, said first, second and third comparator devices being responsive to the amplified modulated sine wave from the gain controlled amplifier.

34. A receiver circuit for receiving a modulated sine wave and separating a pulsed clock signal and a digital data stream from the sine wave, said receiver circuit comprising:

a first comparator device responsive to the modulated sine wave and a first predetermined threshold signal, said first comparator device outputting a first pulse signal;

an inverter responsive to the modulated sine wave and inverting the modulated sine wave;

a second comparator device responsive to the inverted modulated sine wave and a second predetermined threshold signal, said second comparator device outputting a second pulse signal;

a first logic gate responsive to the first pulse signal and the second pulse signal, said first logic gate outputting the pulsed clock signal;

a third comparator device responsive to the modulated sine wave and a third threshold signal, said third comparator device outputting a first set pulse signal;

a fourth comparator device responsive to the inverted modulated sine wave and a fourth threshold signal, said fourth comparator device outputting a first reset pulse signal;

a first flip-flop device responsive to the first set signal and the first reset signal and outputting the first set signal, said first reset signal resetting the first flip-flop device to zero for each pulse of the first reset pulse signal;

a fifth comparator device responsive to the modulated sine wave and a fifth threshold signal, said fifth comparator device outputting a third pulse signal for each positive portion of the modulated sine wave;

a second logic gate responsive to the output from the first flip-flop device and the third pulse signal from the fifth comparator device, said second logic gate outputting a high signal when both the third pulse signal and the output of the first flip-flop device are high;

a sixth comparator device responsive to the modulated sine wave and a sixth threshold signal, said sixth comparator device outputting a second reset pulse signal;

a seventh comparator device responsive to the inverted modulated sine wave and a seventh threshold signal, said seventh comparator device outputting a second set pulse signal;

a second flip-flop device responsive to the second set pulse signal and the second reset pulse signal, said second flip-flop device outputting the second set pulse signal and said second reset pulse signal resetting the output of the second flip-flop to zero each time the second reset pulse signal is high;

an eighth comparator device responsive to the inverted modulated sine wave and an eighth threshold signal, said eighth comparator device outputting a fourth pulse signal for each negative portion of the non-inverted modulated sine wave;

a third logic gate responsive to the output of the second flip-flop device and the fourth pulse signal from the eighth comparator device, said third logic gate outputting a high signal when both the output of the second flip-flop device and the eighth comparator device are high; and a fourth logic gate responsive to the outputs from the second and third logic gates and providing a fifth pulse output each time either of the outputs of the second or third logic gate is high, wherein the output of the fourth logic gate is the digital data stream.

35. The circuit according to claim 34 wherein the first and fourth logic gates are OR gates.

36. The circuit according to claim 34 wherein the second and third logic gates are AND gates.

37. The circuit according to claim 34 wherein the first threshold signal is one volt, the second threshold signal is one volt, the third threshold signal is two volts, the fourth threshold signal is 1.5 volts, the fifth threshold signal is zero volts, the sixth threshold signal is 1.5 volts, the seventh threshold signal is two volts, and the eighth threshold signal is zero volts.

38. The receiver circuit according to claim 34 further comprising an automatic gain controlled amplifier, said automatic gain controlled amplifier receiving the modulated sine wave and amplifying the modulate sine wave.

39. A receiver circuit for receiving a modulated sine wave and separating a pulsed clock signal and a digital data stream from the sine wave, said receiver circuit comprising:

an inverting device responsive to the modulated sine wave and inverting the modulated sine wave;

a first comparator device responsive to the inverted modulated sine wave from the inverting device and a first predetermined threshold signal, said first comparator device outputting a first pulse signal;

a second comparator device responsive to the modulated sine wave and a second predetermined threshold signal, said second comparator device outputting a second pulse signal;

a first logic gate responsive to the first pulse signal and the second pulse signal, said first logic gate outputting the pulsed clock signal;

a third comparator device responsive to the modulated sine wave and a third predetermined threshold signal, said third comparator device outputting a third pulse signal;

a fourth comparator device responsive to the modulated sine wave and a fourth predetermined threshold signal, said fourth comparator device outputting a fourth pulse signal;

a fifth comparator device responsive to the modulated sine wave and a fifth threshold signal, said fifth comparator device outputting a fifth pulse signal;

a sixth comparator device responsive to the modulated sine wave and a sixth threshold signal, said sixth comparator device outputting a sixth pulse signal;

a first flip-flop device responsive to the fourth pulse signal at a set input of the first flip-flop device and the first pulse signal at a reset input of the first flip-flop device, said first flip-flop device outputting a pulse each time the modulated sine wave goes above the fourth threshold signal;

a second flip-flop device responsive to the fifth pulse signal at a set input of the second flip-flop device and the first pulse signal at a reset input of the second flip-flop device, said second flip-flop device outputting a pulse each time the modulated sine wave goes above the fifth threshold signal;

a third flip-flop device responsive to the sixth pulse signal at a set input of the third flip-flop device and the first pulse signal at a reset input of the third flip-flop device, said third flip-flop device outputting a pulse each time the modulated sine wave goes above the sixth threshold signal;

a buffer responsive to the outputs of the first, second and third flip-flop devices and the third pulse signal, said buffer outputting the outputs from the first, second and third flip-flop devices each time it receives a pulse from the third pulse signal;

a second logic gate responsive to the output of the first flip-flop device from the buffer and an inverted output of the second flip-flop device from the buffer, said second logic gate outputting a high signal each time both of its inputs are high;

a third logic gate responsive to the output of the second flip-flop device from the buffer and an inverted output of the third flip-flop device from the buffer, said third logic gate outputting a high signal when both of its inputs are high;

a fourth logic gate responsive to the output of the second logic gate and an output of the third flip-flop device from the buffer, said fourth logic gate outputting a high signal when one or both of its inputs are high;

a fifth logic gate responsive to the output of the third logic gate and the output of the third flip-flop device from the buffer, said fifth logic gate outputting a high signal when one or both of its inputs are high;

a sixth logic gate responsive to the output of the fourth logic gate and an inverted third pulse signal from the third comparator device, said sixth logic gate outputting a high signal when both of its inputs are high;

a seventh logic gate responsive to the output of the fifth logic gate and the third pulse signal, said seventh logic gate outputting a high signal when both of its inputs are high; and an eighth logic gate responsive to the outputs of the sixth and seventh logic gates, said eighth logic gate outputting a high signal when either of its inputs are high, said eighth logic gate outputting the digital data stream.

40. The circuit according to claim 39 wherein the third threshold signal is about zero volts, the fourth threshold signal is greater than the third threshold signal, the fifth threshold signal is greater than the fourth threshold signal, and the sixth threshold signal is greater than the fifth threshold signal.

41. The circuit according to claim 39 wherein the second, third, sixth and seventh logic gates are AND gates.

42. The circuit according to claim 39 wherein the first, fourth, fifth and eighth logic gates are OR gates.

43. The circuit according to claim 39 wherein the buffer is a first-in first-out buffer.

44. A transmitter circuit for transmitting a sine wave modulated with a digital data stream, said transmitter circuit comprising:

a divider responsive to a square-wave clock signal and dividing the clock signal;

a first inverter inverting the clock signal;

a second inverter inverting the divided clock signal from the divider;

a square wave-to-sine wave converter responsive to the inverted and divided clock signal, said converter converting the square wave signal to a sine wave signal;

an output amplifier responsive to the sine wave signal from the converter;

a first logic gate responsive to the inverted clock signal and the divided clock signal, said first logic gate outputting a high signal when the inverted clock signal and the divided clock signal are high;

a first flip-flop device responsive to the output of the first logic gate and the digital data stream, said first flip-flop device transferring the digital data stream to an output of the first flip-flop device when the output of the first logic gate is high;

a second logic gate responsive to the inverted clock signal and a divided and inverted clock signal, said second logic gate outputting a high signal when the inverted clock signal and the inverted and divided clock signal are both high;

a second flip-flop device responsive to the digital data stream and the output of the second logic gate, said second flip-flop device transferring the data signal to an output of the second flip-flop device when the output of the second logic gate is high;

a buffer responsive to the output of the first flip-flop device, the second flip-flop device and an inverted output of the first logic gate, said buffer simultaneously outputting the output of the first flip-flop device and the second flip-flop device each time the inverted output of the first logic gate is high; and a first summing amplifier network including a first summing amplifier and a voltage divider network coupled to a first input of the summing amplifier, said voltage divider network being responsive to both outputs of the buffer, where the first summing amplifier outputs a first signal level, a second signal level, a third signal level or a fourth signal level depending on the output of the buffer, said output of the first summing amplifier being a gain input to the output amplifier.

45. The circuit according to claim 44 wherein the first and second logic gates are AND gates.

46. The circuit according to claim 44 wherein the voltage divider network includes a first variable resistor and a second variable resistor, wherein the first variable resistor is coupled to one output of the buffer and the second variable resistor is coupled to the other output of the buffer.

47. The circuit according to claim 44 further comprising the second summing amplifier, said summing amplifier being responsive to the output of the first summing amplifier and inverting the output of the first summing amplifier.

* * * * *

UNITED STATES PATENT AND TRADEMARK OFFICE
CERTIFICATE OF CORRECTION

PATENT NO. : 6,771,712 B2
DATED : August 3, 2004
INVENTOR(S) : Ricky K. Luhman

It is certified that error appears in the above-identified patent and that said Letters Patent is hereby corrected as shown below:

Title page,
Item [56], References Cited, U.S. PATENT DOCUMENTS, "4,740,998" should be -- 4,740,908 --.

Column 13,
Line 51, remove "the" after "wherein".

Column 14,
Line 19, remove "the" before "at".

Column 19,
Line 1, "reset" should be -- set --.

Signed and Sealed this

Twenty-seventh Day of September, 2005

JON W. DUDAS
*Director of the United States Patent and Trademark Office*